United States Patent Office 3,477,943
Patented Nov. 11, 1969

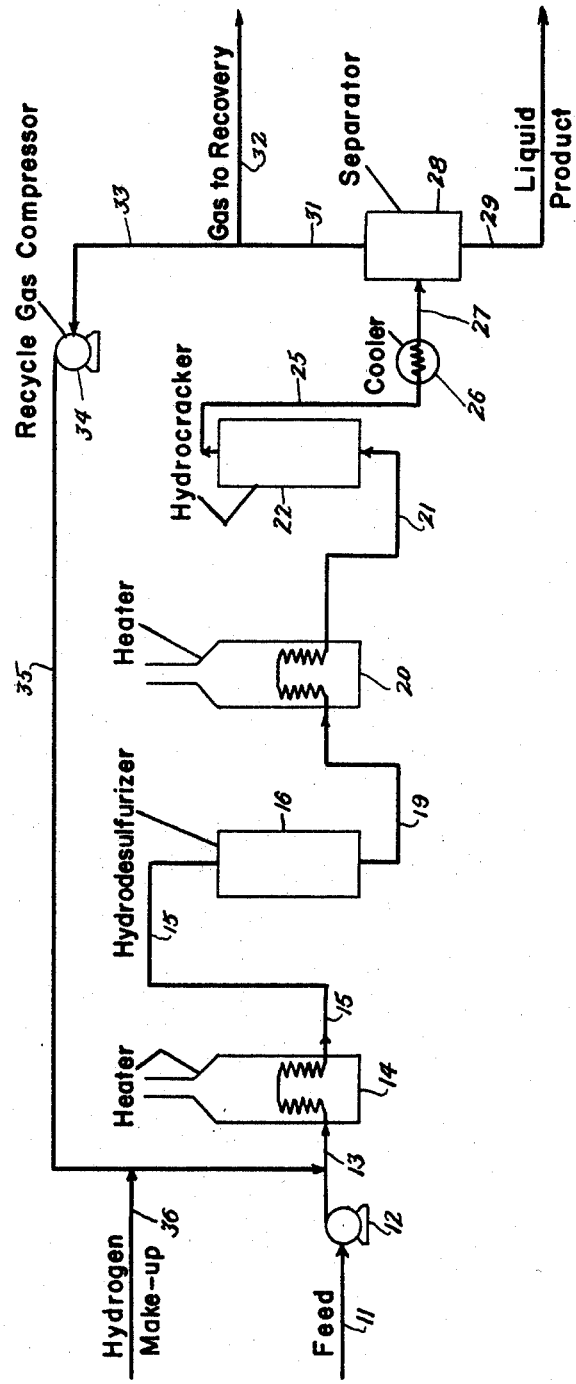

3,477,943
TWO-STAGE TREATMENT OF HIGH SULFUR CONTENT PETROLEUM MATERIALS
George P. Masologites, Broomall, and Harry E. Jacobs and Paul J. White, Media, Pa., assignors to Atlantic Richfield Company, Philadelphia, Pa., a corporation of Pennsylvania
Filed Apr. 25, 1967, Ser. No. 633,580
Int. Cl. C10g 37/00, 23/02, 13/04
U.S. Cl. 208—89                                 5 Claims

ABSTRACT OF THE DISCLOSURE

A two-stage process for treating a high sulfur content petroleum material in order to remove the sulfur contained therein and to produce a naphtha fraction suitable for use as an ethylene charge stock, a low sulfur content furnace oil, and a low sulfur content feed oil, comprising subjecting said petroleum material at a high temperature and high pressure to hydrodesulfurization in the presence of hydrogen and a highly active catalyst to produce a hydrodesulfurized product. Hydrocracking at a high temperature and high pressure in the presence of hydrogen and a specific low activity catalyst, and recovering the products thus produced. The highly active hydrodesulfurization catalyst comprises a member of the group consisting of oxides and sulfides of metals of the left-hand column of Group VI of the Periodic Table of Elements and of iron group metals composited with an activated alumina prepared by drying and calcining an aluminum hydroxide containing from 1.2 to 2.6 moles of water of hydration. The specific low activity hydrocracking catalyst is selected from the group consisting of oxides and sulfides of cobalt, molybdenum, nickel, tungsten and mixtures thereof, deposited on an amorphorus alumina support.

Background of the invention

This invention relates to the treatment of petroleum materials containing residuum fractions. Particularly, this invention relates to a two-stage process for the treatment of said petroleum materials containing appreciable quantities of sulfur and nitrogen and having a metals content of less than about 100 parts per million. More particularly, this invention relates to a two-stage process for the treatment of said petroleum materials in order to produce more valuable products, such as naphtha suitable for use as an ethylene charge stock, and low sulfur content furnace oil and heavy fuel oil. The naphtha produced in the method of our invention has the desirable features of an ethylene charge stock in that it will approximate a virgin naphtha from the standpoint of cyclic content and low iso- to normal ratio of paraffins. Further, both the furnace oil and the heavy fuel oil have a sulfur content less than 0.5 weight percent.

It has been known for some time that petroleum materials containing residuum fractions contain significant quantities of sulfur. The following table sets forth typical properties of petroleum materials containing residuum fractions:

| | Crude oil | | |
|---|---|---|---|
| Properties of residuum | Arabian light | Kuwait | Safaniva |
| Gravity, °API | 17.2 | 16.4 | 12.7 |
| Sulfur content, wt. percent | 3.0 | 3.8 | 4.2 |
| Nitrogen content, p.p.m. | 1,600 | 2,000 | 2,540 |
| Metals content, p.p.m.: | | | |
| Nickel | 8 | 9 | 24 |
| Vanadium | 27 | 46 | 78 |
| Viscosity, cs. at 122° F | 195 | 350 | 2,400 |
| Pour point, ° F | +55 | +50 | +50 |
| Asphaltenes, wt. percent (pentane insolubles) | 4.5 | 6.1 | 14.8 |
| Volume percent of crude | 42 | 54 | 60. |
| (Initial cut point, ° F.) | (660) | (600) | (600) |

A desideratum of the petroleum industry has been to obtain more valuable products, such as high yields of naphtha suitable for use as ethylene charge stock, from such petroleum materials.

It is well-known that the asphaltenes found in petroleum materials containing residuum fractions are very refractory, i.e., difficult to hydrocrack. Therefore, if they are charged directly to hydrocracking, to a large extent they remain unconverted and represent little source material for the valuable products obtained by the cracking operation, e.g., naphtha suitable for use as an ethylene charge stock. By employing an especially active catalyst in a first stage hydrodesulfurizer, the asphaltenes are converted to a hydrogenated form which may then by hydrocracked in the second stage hydrocracker with relative ease.

It is also known that the asphaltene materials are rich in sulfur. By employing an especially active catalyst, we are also obtaining more complete sulfur removal by desulfurization during asphaltene hydrogenation in the hydrodesulfurization step or by producing in hydrodesulfurization a hydrogenated asphaltene where is susceptible to sulfur removal when hydrocracked.

It is also known that the hydrogen content of a hydrocarbon material may be taken as an index of the ease with which it may be cracked. Thus, cycloparaffins may be cracked more easily than aromatics. Use of a more active catalyst thus provides two advantages. First, aromatics which occur in the feed stock may be made more susceptible to hydrocracking by prior conversion to cycloparaffins. In addition, high-boiling aromatics which are produced in the hydrocracker by dehydrogenation may be recycled to the hydrodesulfurization reactor for conversion to cycloparaffins for subsequent hydrocracking.

Moreover, with the growing concern over air pollution, the sulfur content of furnace oil and heavy fuel oil has become a considerably more urgent problem to the petroleum industry. In the United States, about one-third of all fuel oil consumed is in the highly industrialized narrow band of seacoast stretching from Massachusetts to Virginia. Air pollution has already caused the city of New York to set a limit of one weight percent on sulfur after 1971 and other cities, as well as agencies of the Federal Government, are considering similar controls. There seems to be little doubt that the sulfur limit quoted above will be drastically reduced in the future.

SUMMARY OF INVENTION

This invention is concerned with petroleum materials containing residuum fractions such as total crude as well as topped or reduced crude. These terms may be defined as follows:

"Total crude" is defined as a naturally occurring petroleum oil containing residuum fractions which has not been processed in any manner, but preferably separated from water and sediment and desalted.

"Topped or reduced crude" is defined as the residuum petroleum fraction resulting from removal of all or some of those straight run fractions such as gas, gasoline, kerosine, naphtha, furnace oil, gas oil, etc. which are normally removed from the above defined total crude by the process of atmospheric and/or vacuum topping or distillation. Our invention is, however, particularly suitable for the treatment of reduced crudes.

It will be understood, however, to those skilled in the art that the method of our invention will also be suitable for treating petroleum like materials obtained from shale oil, tar sands and coal, said petroleum like materials having properties which are comparable to petroleum materials containing residuum fractions as hereinabove defined.

In accordance with our invention, a petroleum material containing residuum fractions, hereinafter referred to as charge stream, is subjected to a two-stage treatment. In the first stage the charge stream is subjected to hydrodesulfurization. The total effluent from the hydrodesulfurization stage is then subjected to hydrocracking. In both stages the material treated is maintained largely in the liquid phase. The resulting hydrodesulfurized, hydrocracked material is then fractionated by conventional means to obtain naphtha, a low sulfur content heavy fuel oil and furnace oil.

It is therefore an object of our invention to provide an improved method for the treatment of petroleum materials containing residuum fractions, i.e., fractions which cannot be practically distilled.

Another object of our invention is to provide an improved two-stage method for the treatment of petroleum materials containing residuum fractions to maximize the production of a naphtha fraction suitable for use as an ethylene charge stock.

Still another object of our invention is to provide an improved two-stage treatment process for the removal of sulfur in petroleum materials containing residuum fractions.

Yet another object of our invention is to provide an improved method for obtaining a furnace oil and a heavy fuel oil having a low sulfur content.

Other objects, advantages and features of our invention will be apparent to those skilled in the art without departing from the spirit and scope of our invention, and it should be understood that the latter is not necessarily limited to the accompanying discussion and drawing.

In a broad aspect, our invention relates to a process for removing sulfur from a petroleum material containing a residuum fraction comprising hydrodesulfurizing said petroleum material while substantially in the liquid phase in the presence of hydrogen and a catalyst comprising essentially a minor amount of a member of the group consisting of oxides and sulfides of metals of Group VI left-hand column of the Periodic System and of iron group metals composited with a major amount of an activated alumina prepared by drying and calcining a substance which is predominantly composed of an aluminum hydroxide containing from 1.2 to 2.6 mols of water of hydration and thereafter hydrocracking the hydrodesulfurized material while substantially in liquid phase in the presence of hydrogen and a catalyst.

Description of drawing

In order to more fully understand the method of this invention, reference is made to the accompanying drawing which diagrammatically represents a typical flow sheet embodying the two-stage process. Apparatus not considered necessary to an understanding of the invention has been omitted.

Referring to the drawing, a charge stream enters line 11 and is pumped by means of pump 12 through line 13 to heater 14 where it is heated either before or after mixing with hydrogen-rich gas. In the drawing the hydrogen-rich recycle gas passing through line 35 is combined with hydrogen-rich make-up gas passing through line 36, the hydrogen-rich gas is then combined with the feed passing through line 13. The mixture of the charge and the hydrogen-rich gas passes through line 15 into the hydrodesulfurizer 16. The hydrodesulfurized effluent passes by means of line 19, heater 20 and line 21 into the hydrocracker 22. The hydrocracked product leaves the hydrocracker 22 by means of line 25, cooler 26, and line 27 and passes into the high pressure separator 28. The liquid product is withdrawn from the separator by means of line 29.

Gases from the high pressure separator are withdrawn through line 31. A first portion of the gas flows from line 31 through line 32 to conventional gas recovery facilities. A second portion of the gas flows through line 33 and is compressed by compressor 34. The gas then passes through line 35 and is admixed with make-up hydrogen from line 36. This hydrogen-rich gas is preheated separately or in admixture with the charge stream in heater 14. The admixture then flows through line 15 as previously described.

Preferred embodiments

In the first stage of the method of our invention, the charge stream is subjected to liquid phase hydrodesulfurization in the presence of a catalyst and a hydrogen-containing gas at elevated temperatures and pressures. The temperature is maintained in the range from about 600° F. to about 850° F., preferably from about 700° F. to about 825° F., and the pressure is maintained in the range from about 500 p.s.i.g. to about 5000 p.s.i.g., preferably from about 1500 p.s.i.g. to about 3500 p.s.i.g. Any convenient means for effecting hydrodesulfurization can be used. A fixed bed reactor, however, is particularly suitable and is preferred.

The total effluent stream from the hydrodesulfurizer is then passed to a hydrocracker where it is contacted in the presence of a catalyst with hydrogen-containing gas at elevated temperatures and pressures. Suitable hydrocracking temperatures fall in the range from about 700° F. to about 1000° F., preferably in the range of from about 750° F. to about 900° F. The pressure is maintained in the range of from about 500 p.s.i.g. to about 5000 p.s.i.g., although a pressure in the range of from about 1500 p.s.i.g. to about 3500 p.s.i.g. is preferred. Any conventional means for contacting the charge stream with the hydrogen-containing gas and catalyst can be used. For example, the process can be operated by using various manipulative steps, e.g., upflow, downflow and horizontal flow of the liquid, concurrent and countercurrent flow of the gasiform material relative to the flow of liquid and the use of solid contact materials in the form of fixed, moving and fluidized beds. A particularly suitable means for accomplishing the purposes of our invention resides in the use of an ebullated bed.

In an ebullated bed reactor, the liquid and gasiform material is concurrently passed upwardly through a vessel containing particulate catalyst, the mass of catalyst being maintained in random motion in the vessel by the upflowing streams. The mass of catalyst in this state of random motion in the liquid medium is described as "ebullated." The motion of the catalyst makes the reactor free from pressure drop limitations prevalently obtained in fixed beds due to carbon formation, and results in a narrow temperature gradient fom the top to the bottom of the reactor. Ebullated bed reactors are now well-known to those skilled in the art.

The hydrogen supplied to the two-stage system need not be 100 percent pure hydrogen but may contain such other constituents as nitrogen, methane, ethane, etc. Preferably, the hydrogen-rich gas stream should contain not less than 50 volume percent hydrogen. The hydrogen-containing gas is recycled at a rate to provide at least 2500 s.c.f. of hydrogen per barrel of charge stream undergoing treatment. Preferably, hydrogen is recycled at a rate to provide about 5000 s.c.f. to about 10,000 s.c.f. per barrel of the charge stream. Hydrogen make-up is added to the system in an amount equivalent to that consumed in the reactions plus losses to the recovery system.

The liquid hourly space velocity in each of the reactors is maintained in the range from about 0.25 to about 5.0. Preferably, in the range from about 0.5 to about 3.0.

Well-known hydrodesulfurization catalysts are not effective in the two-stage method of our invention. A highly active catalyst must be employed. We have discovered that a particularly effective catalyst for the first stage of the present method is a catalyst which comprises a member of the group consisting of oxides and sulfides of metals such as vanadium, chromium or molybdenum, metals of the left-hand column of Group VI of the Periodic Table of Elements, or iron, cobalt, nickel, platinum, etc. composited with a major amount of an activated alumina prepared by drying and calcining a substance which is predominantly composed of an aluminum hydroxide containing from 1.2 to 2.6 moles of water of hydration. The preparation of this catalyst is disclosed in Flinn et al., Patent No. 3,222,273 (1965), which patent is hereby incorporated by reference.

Applicable catalysts for the second stage treatment comprise low-acidity catalysts in the form of beads, pellets, powder, extrudates or like particles. The size and shape of the catalyst employed depends on the particular conditions of the process, e.g., the density, viscosity and velocity of the liquid involved in the process.

In general, suitable catalysts include the metals of Groups VI and VIII of the Periodic Table of Elements, and their oxides or sulfides, either alone or in admixture with each other, deposited on amorphous metal oxide support wherein the metal oxide is selected from the group consisting of silica, oxides of metals in Groups II-A, III-A and IV-B of the Periodic Table, and mixtures thereof. Examples of Group VI metals are tungsten and chromium, with the preferred Group VI metal being molybdenum in the form of a molybdate; examples of Group VIII metal components are cobalt and nickel; and examples of the metal oxides in the amorphous support are alumina, silica, zirconia, magnesia, titania, ceria, thoria, etc. In particular, such catalysts are typified by nickel sulfide-tungsten sulfide, molybdenum sulfide or oxide, combinations of metal sulfides or oxides such as ferric oxide, molybdenum oxide or sulfide and cobalt oxide, all of which are supported on the above amorphous metal oxide supports. Particularly suitable and preferred catalysts include catalysts having from about 1 to 10, preferably 2-4 weight percent of a Group VIII metal oxide, preferably cobalt oxide; and from about 5-30, preferably 10-15 weight percent of a Group VI metal oxide, preferably molybdenum; supported on the amorphous metal oxide support, preferably alumina.

It should be understood that the flow sheet shown to illustrate the embodiment of the present invention is highly simplified for the purpose of clarity. Conventional means for heating and cooling, including but not limited to the use of heat exchange with feed or products streams, can be employed in place of various heating and cooling units. It will also be understood that, if desired, additional hydrogen can be added at various points within the system. Also, it may be preferable in some instances to utilize multiple reactors in series or in parallel.

In order to more fully understand the method of our invention reference is made to the following example.

EXAMPLE

An integrated process similar to the complete process illustrated in the drawing is described in this example. As an aid to the understanding of this example, reference will be made to the drawing whenever applicable. A charge stock having the following composition is fed into conduit 11 at the rate of 10,000 bbls./day.

Charge stock, (long residuum, Kuwait 47.8% of crude)
Gravity, ° API _____ 14.5
Percent sulfur (wt. percent) _____ 4.0
Vanadium content, p.p.m. _____ 78
Nickel content, p.p.m. _____ 28

At least 95 percent of the material of this stock has a boiling point above 675° F. The charge stock is combined with 10,200 s.c.f. of hydrogen/bbl. of feed. The combined stream is passed through heater 14 into the hydrodesulfurizer 16.

Hydrodesulfurization in unit 16 is carried out at a pressure of approximately 2500 p.s.i.g. and at a temperature of approximately 775° F., and at a liquid hourly space velocity of 1. The catalyst is nickel, cobalt and molybdenum (respectively, 0.5, 1.0 and 8.0 percent by weight) deposited on calcined (1000° F. for 10 hours) aluminum hydroxide containing 1.7 moles of water of hydration. The catalyst is prepared in the manner as set forth in Example I in Patent No. 3,222,273 to Flinn et al. (1965).

The effluent from the hydrodesulfurizer 16 is heated and then subjected to hydrocracking in unit 22. The hydrocracking is carried out at a pressure of approximately 2500 p.s.i.g. and at a temperature of approximately 850° F. in the presence of a cobalt molybdate catalyst containing 3 percent cobalt oxide and 12 percent molybdenum oxide by weight on an alumina support. Effluent from the hydrocracker 22 is cooled to 100° F. and passed to a separator 28 where it is flashed. The combined liquid product removed through line 28 and the vapor removed through line 32 has the following composition.

$C_1$–$C_3$ _____lbs./day__ 200,000
$C_4$—400° F (naphtha fraction) ____bbls./day__ 3600
Furnace oil (400° F.–675° F. B.P. range)
  (0.07% sulfur) _____bbls./day__ 4300
Heavy fuel oil (B.P.>675° F.) (<0.30 percent
  sulfur) _____bbls./day__ 2900

The hydrogen make-up passing through line 36 is added in the amount of 2700 s.c.f./bbl. of feed entering line 11. Gas is removed to recovery through line 32 at the rate of 10 million s.c.f./day. Hydrogen sulfide, and ammonia are also removed through line 32. The liquid hourly space velocity in the hydrocracker 22 (an ebullated bed) measured at the expanded bed condition is 1.0.

Thus, a novel process is provided by the present invention for treating petroleum materials containing residuum fractions to produce a product from which high yields of naphtha suitable for use as an ethylene charge stock and heavy fuel oil of low sulfur content can be obtained. Obviously, many modifications and variations of the present invention as hereinbefore set forth may be made without departing from the spirit and scope thereof.

What is claimed is:

1. The two-staged process for treating a high sulfur content petroleum material containing a substantial proportion of a residuum fraction, said material having a metals content of from about 20 to 100 p.p.m. which comprises: subjecting said petroleum fraction while substantially in liquid phase to hydrodesulfurization at a temperature between 600 and 850° F. and a pressure between 500 and 5000 p.s.i.g. in the presence of a catalyst comprising a member of the group consisting of oxides and sulfides of metals of the left-hand column of Group VI of the Periodic Table of Elements and of iron group metals composited with an activated alumina prepared by drying and calcining an aluminum hydroxide containing from 1.2 to 2.6 moles of water of hydration to produce a low sulfur petroleum material, hydrocracking the hydrodesulfurized material while substantially in liquid phase in the presence of a hydrocracking catalyst selected from the group consisting of oxides and sulfides of cobalt, molybdenum, nickel, tungsten and mixtures thereof, deposited on an amorphous alumina support at a pressure of 500 to 5000 p.s.i.g. and a temperature of 700 to 1000° F., to produce a low sulfur heavy fuel oil and a hydrocarbon fraction boiling in the naphtha range which is suitable as an ethylene charge stock, and thereafter recovering a product stream containing said naphtha and said heavy fuel oil.

2. The process according to claim 1 wherein hydrodesulfurization is effected at a temperature of 700–825° F. and a pressure of between 1500–3500 p.s.i.g.

3. The process according to claim 2 wherein the hydrocracking is effected at a temperature between 750 and 900° F. and at a pressure of 1500–3500 p.s.i.g.

4. The process according to claim 1 wherein the heavy fuel oil has a sulfur content of below about 0.5 weight percent.

5. The process according to claim 1 wherein hydrocracking catalyst is cobalt molybdate supported on alumina.

References Cited

UNITED STATES PATENTS

| | | | |
|---|---|---|---|
| 2,885,352 | 5/1959 | Ciapetta et al. | 208—217 |
| 3,222,273 | 12/1965 | Flinn et al. | 208—112 |
| 3,272,734 | 9/1966 | MacLaren | 208—110 |
| 3,159,568 | 12/1964 | Price et al. | 208—89 |
| 3,260,663 | 7/1966 | Inwood et al. | 208—59 |

DELBERT E. GANTZ, Primary Examiner

T. H. YOUNG, Assistant Examiner

U.S. Cl. X.R.

208—59